US010360798B2

(12) United States Patent
Jerichow et al.

(10) Patent No.: US 10,360,798 B2
(45) Date of Patent: Jul. 23, 2019

(54) SYSTEM AND METHOD FOR TRUST PARAMETERS IN VEHICLE WARNING MESSAGES

(71) Applicant: Nokia Technologies Oy, Espoo (FI)

(72) Inventors: Anja Jerichow, Grafing (DE); Joachim Lueken, Munich (DE); Wolfgang Scheidl, Bernhardswald (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/838,306

(22) Filed: Dec. 11, 2017

(65) Prior Publication Data

US 2018/0322785 A1 Nov. 8, 2018

Related U.S. Application Data

(60) Provisional application No. 62/503,234, filed on May 8, 2017.

(51) Int. Cl.
*G08G 1/01* (2006.01)
*G08G 1/16* (2006.01)
(Continued)

(52) U.S. Cl.
CPC ............ *G08G 1/162* (2013.01); *G08G 1/012* (2013.01); *G08G 1/0112* (2013.01); *G08G 1/0129* (2013.01); *G08G 1/0141* (2013.01); *G08G 1/0965* (2013.01); *G08G 1/09675* (2013.01); *G08G 1/096716* (2013.01); *G08G 1/096775* (2013.01); *G08G 1/096791* (2013.01); *H04L 67/12* (2013.01); *G08G 1/164* (2013.01)

(58) Field of Classification Search
CPC .... G08G 1/205; G08G 1/09675; G08G 1/056; G08G 1/096741; G08G 1/162; G08G 1/164; G08G 1/0965; G06T 7/223; G06T 7/0002; G06N 7/005; G06K 9/78; G06K 9/007; H04L 67/12
See application file for complete search history.

(56) References Cited

U.S. PATENT DOCUMENTS 9,195,914 B2 * 11/2015 Fairfield ................. G06K 9/78
9,384,491 B1 * 7/2016 Briggs ................... G08G 1/205
(Continued)

OTHER PUBLICATIONS

PCT/US2018/030359. International Search Report & Written Opinion (dated Sep. 5, 2018).

*Primary Examiner* — Hoi C Lau
(74) *Attorney, Agent, or Firm* — Loza & Loza, LLP; Jessica W. Smith

(57) ABSTRACT

An application server in a cellular network receives incident information and determines a trust value associated with the incident information using one or more trust parameters. The application server generates a warning message including the the trust value and the one or more trust parameters. The warning message is broadcast to user equipment in vehicles in an area of relevance. The user equipment in the vehicles in the area of relevance receives the warning message and may re-evaluate the trust value in the warning message based on additional trust parameters or information. The user equipment may determine to perform one or more actions based on the trust value, such as providing a warning to a driver or performing a braking operation.

20 Claims, 12 Drawing Sheets

(51) Int. Cl.
  *H04L 29/08* (2006.01)
  *G08G 1/0965* (2006.01)
  *G08G 1/0967* (2006.01)

(56) References Cited

U.S. PATENT DOCUMENTS

| | | | | |
|---|---|---|---|---|
| 9,658,620 | B1* | 5/2017 | Urmson | G06T 7/223 |
| 9,659,301 | B1* | 5/2017 | Briggs | H04W 4/70 |
| 10,102,745 | B2* | 10/2018 | Tamura | G06N 7/005 |
| 2003/0221005 | A1* | 11/2003 | Betge-Brezetz | H04L 41/22 |
| | | | | 709/224 |
| 2004/0204812 | A1* | 10/2004 | Tran | B60T 8/172 |
| | | | | 701/80 |
| 2004/0225718 | A1* | 11/2004 | Heinzel | G06Q 10/107 |
| | | | | 709/206 |
| 2006/0015254 | A1* | 1/2006 | Smith | H04W 4/02 |
| | | | | 702/3 |
| 2009/0179777 | A1* | 7/2009 | Ishikawa | G01M 15/042 |
| | | | | 340/939 |
| 2010/0207787 | A1* | 8/2010 | Catten | G06F 17/30241 |
| | | | | 340/905 |
| 2010/0250106 | A1* | 9/2010 | Bai | G08G 1/096716 |
| | | | | 701/117 |
| 2011/0043377 | A1* | 2/2011 | McGrath | G08G 1/09675 |
| | | | | 340/905 |
| 2013/0151690 | A1* | 6/2013 | Shah | G06Q 10/10 |
| | | | | 709/224 |
| 2013/0154854 | A1* | 6/2013 | Chen | G08G 1/096741 |
| | | | | 340/905 |
| 2015/0339811 | A1* | 11/2015 | Zhong | G06T 7/0002 |
| | | | | 382/104 |
| 2016/0232453 | A1* | 8/2016 | Daly | H04W 4/12 |
| 2017/0018178 | A1* | 1/2017 | Poechmueller | G08G 1/056 |
| 2017/0294119 | A1* | 10/2017 | Tamura | G06N 7/005 |
| 2018/0012460 | A1* | 1/2018 | Heitz, III | G08B 13/19656 |
| 2018/0322785 | A1* | 11/2018 | Jerichow | G08G 1/162 |

* cited by examiner

SYSTEM AND METHOD FOR TRUST PARAMETERS IN VEHICLE WARNING MESSAGES

TECHNICAL FIELD

The present disclosure relates generally to network communications and, more particularly, to an apparatus and method for transmitting messages in intelligent transportation systems (ITS) including trust parameters.

DESCRIPTION OF RELATED ART

Intelligent transportation systems (ITS) include vehicle-to-vehicle (V2V), vehicle-to-infrastructure (V2I), vehicle to pedestrian (V2P) and vehicle to network (V2N) communications. Such communications and networks are sometimes referred to as Vehicle-to-Everything (V2X) technology. V2X technology enables vehicles to communicate with other vehicles, road side units, pedestrians or with centralized networks and services, e.g. about traffic or potential dangerous road conditions. V2X may issue warnings to drivers of road hazards, helping to reduce traffic injuries and fatalities. In addition to improving safety, V2X helps to optimize traffic flow, reduce traffic congestion and lessen the environmental impact of transportation. V2X figures prominently in a future with safe, efficient and environmentally-conscious transportation and paves the way to connected and automated driving (CAD).

V2X, also referred to as intelligent transportation systems (ITS), include systems in which information and communication technologies are applied in the field of transportation, including infrastructure, vehicles and users, and in traffic management and mobility management, as well as for interfaces with other modes of transportation. Various forms of wireless communications technologies have been proposed for intelligent transportation systems.

In October 1999, the United States Federal Communications Commission (FCC) allocated spectrum in the 5.9 GHz band to be used by intelligent transportation systems (ITS).

Short-range communications for wireless access in vehicular environments (WAVE) may be implemented using various protocols, e.g., the Dedicated Short Range Communications (DSRC) standard. For example, specifications defined in IEEE 802.11P and IEEE 1609 include a description of short range DSRC/WAVE networks. DSRC/WAVE standards include a short latency requirement for road safety messaging and control.

Longer range communications may be accomplished using IEEE 802.16 WiMAX, Global System for Mobile Communications (GSM), or LTE/3GPP network or other types of cellular networks. These wireless long range, wide area or cellular networks may enhance ITS short range networks by aggregating data at a centralized V2X application server. The centralized V2X application server may be configured to evaluate and distribute data to a wider area over the cellular network and to more users than short range ITS networks, e.g. as specified by the IEEE WAVE/DSRC technology.

For example, the 3GPP LTE cellular network may enhance IEEE WAVE/DSRC technology by enabling communication between vehicles (e.g., using a PC5 interface) and using existing infrastructure for communication between vehicles and the LTE network. Further, 3GPP 5G specification has identified V2X as one of the verticals, for which a dedicated network slice may be aggregated. The 5G Automotive Alliance (5GAA) has also begun to develop and accelerate the availability of communications solutions for connected mobility, road safety, autonomous driving and intelligent transportation.

With the advancement of V2X communications, information received by a vehicle or other type of user equipment (UE) either from another UE or over a network may be suspect. Thus there is a need for determining a level of trust in information received via V2X type communications.

SUMMARY

In an embodiment, an application server in a wireless network includes a network interface configured to communicate with one or more components in the wireless network and a processing circuit configured to receive an alert message including incident information from user equipment (UE) in a vehicle over the wireless network. The processing circuit is also configured to determine a trust value associated with the incident information, generate a warning message including the trust value in a trust information parameter field and transmit the warning message for broadcast within an area of relevance.

In another embodiment, user equipment in a vehicle includes a network interface configured to communicate with one or more components in a cellular network; and a processing circuit configured to receive a warning message including incident information over the cellular network. The processing circuit is further configured to extract one or more trust parameters associated with the incident information from the warning message and determine a trust value associated with the incident information using the one or more trust parameters.

In still another embodiment, a method includes receiving incident information and determining one or more trust parameters associated with the incident information. The method further includes generating an alert message with the incident information and the one or more trust parameters and transmitting the alert message with the one or more trust parameters over a cellular network to a centralized application server.

In one or more of the above embodiments, the user equipment or application server is further configured to receive an alert message including additional incident information and re-evaluate the trust value in response to the additional incident information.

In one or more of the above embodiments, the user equipment is further configured to transmit the alert message with the one or more trust parameters over a vehicle to vehicle communication interface to another vehicle.

In one or more of the above embodiments, the user equipment may also be further configured to receive additional incident information from one or more vehicle sensors and re-evaluate the trust value in response to the additional incident information.

In one or more of the above embodiments, the trust value measures an accuracy of the incident information.

BRIEF DESCRIPTION OF THE DRAWINGS

Some embodiments of apparatus and/or methods in accordance with embodiments of the disclosure are now described, by way of example only, and with reference to the accompanying drawings, in which.

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass equivalents thereof. The following abbreviations are herewith expanded, at least some of which are referred to within the following description.

Figure 1:
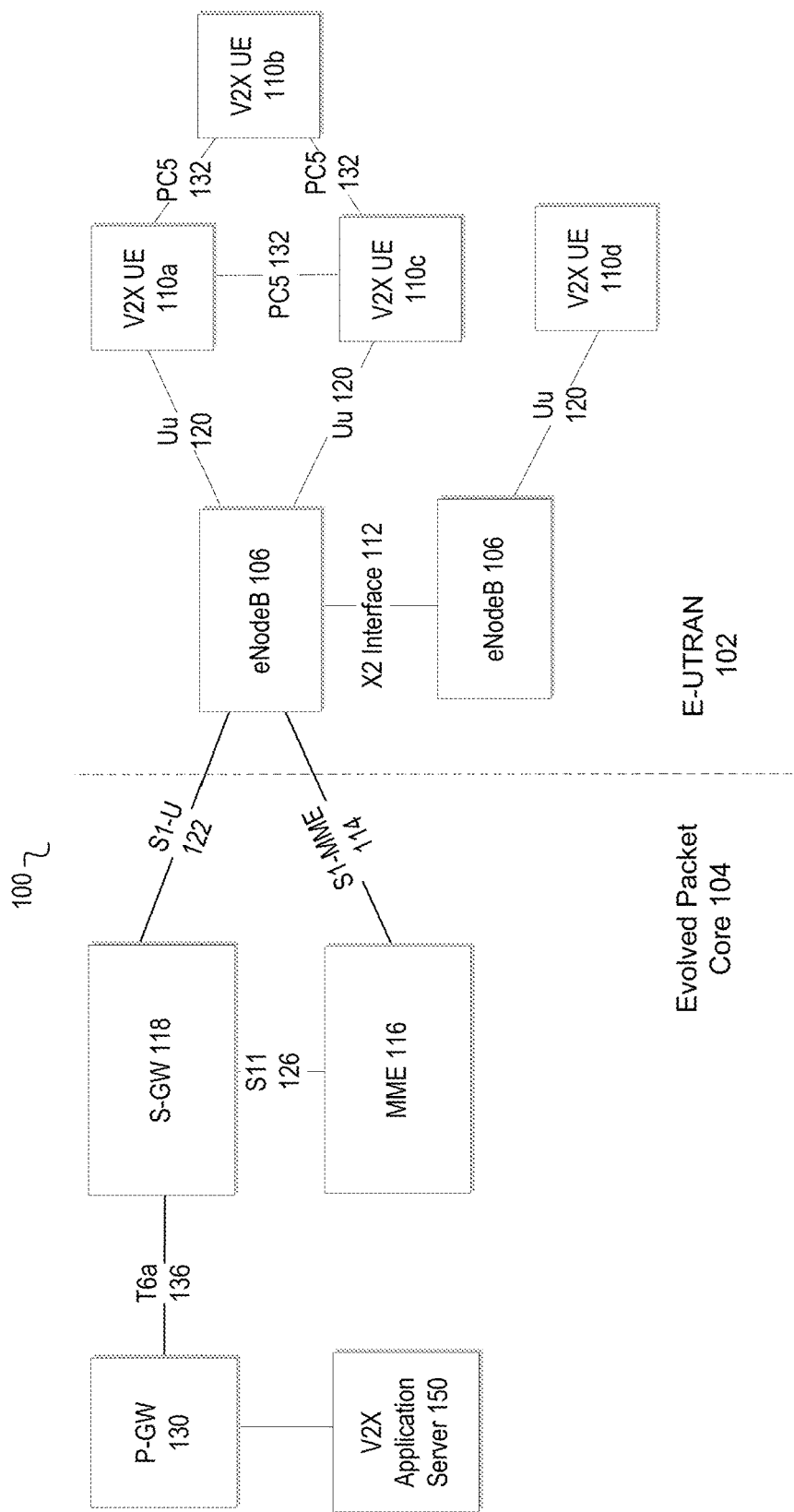
FIG. 1 illustrates a schematic block diagram illustrating an embodiment of selected components of an exemplary wireless network in which embodiments described herein may be implemented.

3GPP 3$^{rd}$ Generation Partnership Project
EPS Evolved Packet System
ETSI European Telecommunications Standards Institute
IEEE Institute of Electrical and Electronics Engineers
IMSI International Mobile Subscriber Identity
ITS Intelligent Transportation System
MME Mobility Management Entity
MO Management Object
SGW Serving Gateway
SMS Short Message Service
UE User Equipment
V2X Vehicle-to-Everything
V2X-AS V2X application server
V2X-UE V2X user equipment FIG. 1 illustrates a schematic block diagram illustrating an embodiment of selected components of an exemplary wireless network 100 in which embodiments described herein may be implemented. The wireless network 100 may include various type of cellular networks including, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) or other long range wireless networks. In one implementation in which the wireless network 100 is an LTE type cellular network, the overlay access network includes an evolved Universal Terrestrial Radio Access Network (E-UTRAN) 102 connected to an evolved packet core (EPC) 104. The E-UTRAN 102 includes at least one Universal Terrestrial Radio Access Network (UTRAN) node B or eNB or eNodeB 106. The eNodeBs 106 are interconnected with each other in the E-UTRAN 102 by means of an X2 interface 112. The eNodeBs 106 provide an air interface (I/F) to V2X user equipment (V2X-UE 110).

In other embodiments, different types of radio access networks (RAN) may be implemented, e.g. a base transceiver station (BTS) and radio network controller (RNC). Thus, a base station (BS), base transceiver station (BTS) or any type of RAN controller may perform the same or similar functions as described herein with respect to an eNodeB 106. Other types of protocols, such as IEEE 802.16 WiMax set of standards, may also be deployed.

The eNodeBs 106 are connected by means of an S1 interface 114 to the EPC 104, and e.g., more specifically to a Mobility Management Entity (MME 116) by means of the S1-MME protocol 114, to a Serving Gateway (S-GW) 118 by means of the S1-U protocol 122. The S-GW 118 routes and forwards user data packets, while also acting as the mobility manager for the user plane. The S-GW 118 communicates with a Packet Gateway (P-GW) 130 over a T6a interface 136. The P-GW 130 may be connected to a wide area network (Internet), application server, etc. For example, the P-GW 130 may be communicatively coupled to a V2X application server 150 either directly or through a local area network (LAN) or WAN (such as the Internet).

The MME 116 is a main control node for the LTE access-network providing signaling to the V2X-UE 110s. The MME 116 may be a standalone node or a combined logical node with the P-GW 130 or S-GW 118 having MME functionality 116.

The eNodeBs 106 and V2X-UEs 110 communicate over an air interface 120 using a Uu signaling protocol. The eNodeBs 106 may also use one or more other protocols for communicating over the air interface to the V2X-UEs 110. For example, Multimedia Broadcast Multicast Services (MBMS) is a point-to-multipoint interface specification for 3GPP cellular networks, which is designed to provide efficient delivery of broadcast and multicast services, both within a cell as well as within the core network. For broadcast transmission across multiple cells, it defines transmission via single-frequency network configurations. The specification is referred to as Evolved Multimedia Broadcast Multicast Services (eMBMS) when transmissions are delivered through an LTE (Long Term Evolution) network. eMBMS is also known as LTE Broadcast. The eNodeBs 106 may broadcast messages to the V2X-UEs 110 using the MBMS or eMBMS protocol.

For vehicle to vehicle (V2V) communications using distributed scheduling, a wireless air interface 132 using the PC5 protocol is specified by the 3GPP standards. The PC5 interface 132 may be used to communicate directly between V2X-UEs without signaling from an eNodeB 106. The PC5 interface 132 is a short range communication interface for scheduling and interference management of V2V traffic based on distributed algorithms implemented between the V2X UE 110. The distributed algorithm is based on sensing with semi-persistent transmission. Resource allocation may be dependent on geographical information. In other embodiments, scheduling and interference management of V2V traffic is assisted by eNodeBs 106 via control signaling over the Uu air interface 120. The eNodeB 106 may then assign the resources being used for V2V signaling in a dynamic manner The V2X-UE 110 may include vehicles, such as cars, trucks, motorcycles, bicycles, drones, planes, trains or even pedestrians or other user devices. A V2X-UE 110 may also include infrastructure equipment, such as road signs, traffic lights, toll stations, barriers, traffic cameras, gates or other types of infrastructure. A V2X-UE 110 may also include temperature sensors, weather sensors or traffic sensors providing data of transportation conditions.

Figure 2:
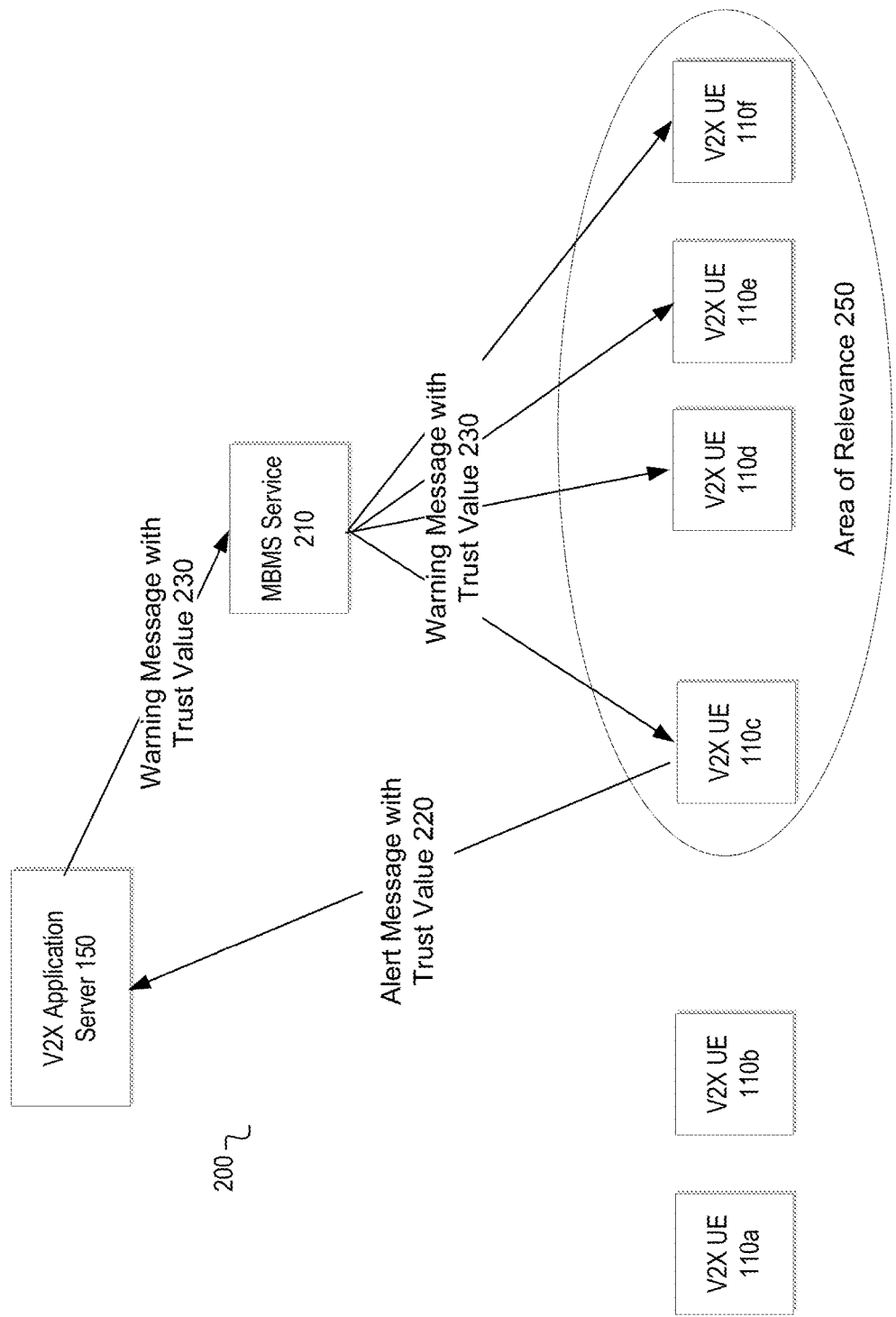
FIG. 2 illustrates a schematic block diagram of an embodiment of selected components of an exemplary V2X network.

FIG. 2 illustrates a schematic block diagram of an embodiment of selected components of an exemplary V2X network 200. A V2X application server (V2X-AS) 150 may receive periodic status messages and/or asynchronous notification messages from one or more V2X user equipment (V2X-UE). For example, the periodic status messages may be based on the standard defined in ETSI EN 302 637-2 entitled, "Cooperative Awareness Basic Service," which is hereby incorporated by reference herein. The Cooperative Awareness Basic Service enables the exchange of information, including position, dynamics and attributes. The ETSI EN 302 637-2 standard specifies the syntax and semantics of a Cooperative Awareness Message (CAM) and provides detailed specifications on the message handling. ETSI TS 102 637-2 V1.2.1 (2011-03) entitled, "Intelligent Transport Systems (ITS); Vehicular Communications; Basic Set of Applications; Part 2: Specification of Cooperative Awareness Basic Service," describes a general overview of Cooperative Awareness Messages (CAMs) and is hereby incorporated by reference herein.

The asynchronous notifications may include a format and syntax of a Decentralized Environmental Notification Message (DENM), as defined in ETSI EN 302 637-3 entitled, "Decentralized Environmental Notification Basic Service," which is hereby incorporated by reference herein. The Decentralized Environmental Notification Message (DENM) format includes information related to a road hazard or an abnormal traffic condition, including its type and position. Though the CAM and DENM message formats are described herein, the periodic or asynchronous alert messages from a V2X UE 110 may include other formats or protocols. In an embodiment, the periodic or asynchronous alert messages generated by a V2X-UE are transmitted directly to other V2X-UEs or transmitted to the centralized V2X-application server (V2X-AS) 150.

The centralized V2X-AS 150 receives periodic or asynchronous alert messages from one or more V2X-UEs 110. The V2X-AS 150 processes the alert messages with other received alert messages and/or other information. The centralized V2X-AS evaluates and analyses the data received from the plurality of V2X-UEs 110 and broadcasts a warning message in an area of relevance (AoR) 250, e.g. using an MB2-interface from an application server/content provider to the BM-SC that distributes via a broadcast service. For example, the 3GPP TS 23.285 entitled, "Architecture enhancements for V2X services", which is hereby incorporated by reference herein, describes that such messages may be transmitted to a broader geographical area using the MBMS service 210 over an LTE cellular network. Hence, data in a DENM alert message provided by a V2X-UE 110 may be redistributed by the V2X-AS 150 using the MBMS service 210 over the LTE network. The data in the broadcast warning message may thus reach a wider geographical area and more UEs compared to V2V communications alone or via short range ITS technology alone, such as ITS/WAVE technology.

However, the broadcast distribution of data from V2X alert messages in a wider geographical area of relevance brings new challenges. A problem exists regarding the level of trust in the data. As an example, a V2X-UE 110 may send an alert message (e.g., in a DENM type message format) for road hazard warnings, such as detected ice on the street. The alert message is received and processed by the centralized V2X-AS 150. Depending on the evaluation, the V2X-AS 150 may distribute or broadcast a warning message with the road hazard data over a geographical area of relevance 250. However, this process needs to be timely. The V2X-AS 150 should distribute the message while the data is still relevant. For example, a warning about ice on the street may need to be distributed without waiting for further confirmation. Such information needs to be distributed quickly for a timely warning to other V2X-UEs 110 in the area and further confirmation of the data may not be received in time. However, if a V2X-UE 110 transmits incorrect information to the V2X-AS 150, this incorrect information may be distributed to other V2X-UEs 110 in the area of relevance (AoR) 250. For example, the false information may be due to malware on a V2X-UE 110. In addition, a malicious attack by a V2X-UE 110 may purposely transmit false information. Alternatively, a V2X-UE 110 may transmit false information due to sensor malfunction or failure.

In order to provide a more reliable warning service, a system and method is configured to evaluate a level of trust in information, e.g. either from a V2X-UE 110 or from another source. The level of trust in the information is different from trust achieved through authentication of a UE or message or securing the integrity of messages. In an embodiment, a method and system is described herein for determining a trust value or trust level in the information that a V2X-UE 110 sends or receives either via the LTE network or from other V2X-UEs 110 directly.

In an embodiment, a level of trust in data is evaluated and at least one parameter is included in an alert message from a V2X-UE 110 or in a warning message from a V2X-AS 150. The level of trust may be evaluated using one or more methods. For example, the first message received with information of a road hazard from a V2X-UE 110, e.g. in an alert message, the V2X-AS 150 may not have any other data to corroborate the accuracy of the information. When the same or similar information is provided by additional sources independently, confidence in the accuracy of the information increases. For example, confidence may increase with additional alert messages including the same or similar information from the area of relevance 250.

In an embodiment, shown in FIG. 2, the V2X-AS 150 receives an alert message with a trust value 220 from a V2X-UE 110*c*. The trust value may be determined by the V2X-UE 110*c* using one or more methods described herein. The V2X-AS 150 determines a level of trust in the information using the trust value from the V2X-UE 110*c* and other information. The V2X-AS 150 then assigns a trust value to the information. The trust value is then included as a parameter in a warning message 230 from the V2X-AS 150. The trust value may be included in an information parameter field of the warning message 230, and then distributed by an MBMS service 210 with the warning message 230 to other V2X-UEs 110 in the area of relevance 250. A V2X-UE 110 in the area of relevance 250 receiving the warning message 230 may also re-evaluate the assigned trust value of the information.

Though a V2X-AS 150 is illustrated, similar functionality may be performed by a third party service provider. Thus, the V2X-AS 150 may be included in the LTE service provider network or in a third party service provider network that communicates through the LTE service provider network. Alternatively, Mobile Edge Computing (MEC) architecture may be implemented wherein the functionality of the V2X-AS 150 is implemented at the RAN levels, e.g. at the cellular base stations or eNodeBs 106, and enables flexible and rapid deployment of the applications and services. A MEC application server in the radio access network (RAN) may implement the functionality of the V2X-AS 150 described herein, e.g. incorporated within an eNodeB 1-6, or by a MEC application server coupled to the eNodeB 106. The LTE service provider may provide authorized third-parties, such as application developers and content providers, to provide the V2X service described herein at the RAN level. Thus the V2X-AS 150 described herein may include an MEC application server deployed at an eNodeB 106 that is part of an LTE cellular network, or at a Radio Network Controller (RNC) that is part of a 3G cellular network and/or at a multi-technology cell aggregation site.

Figure 3:
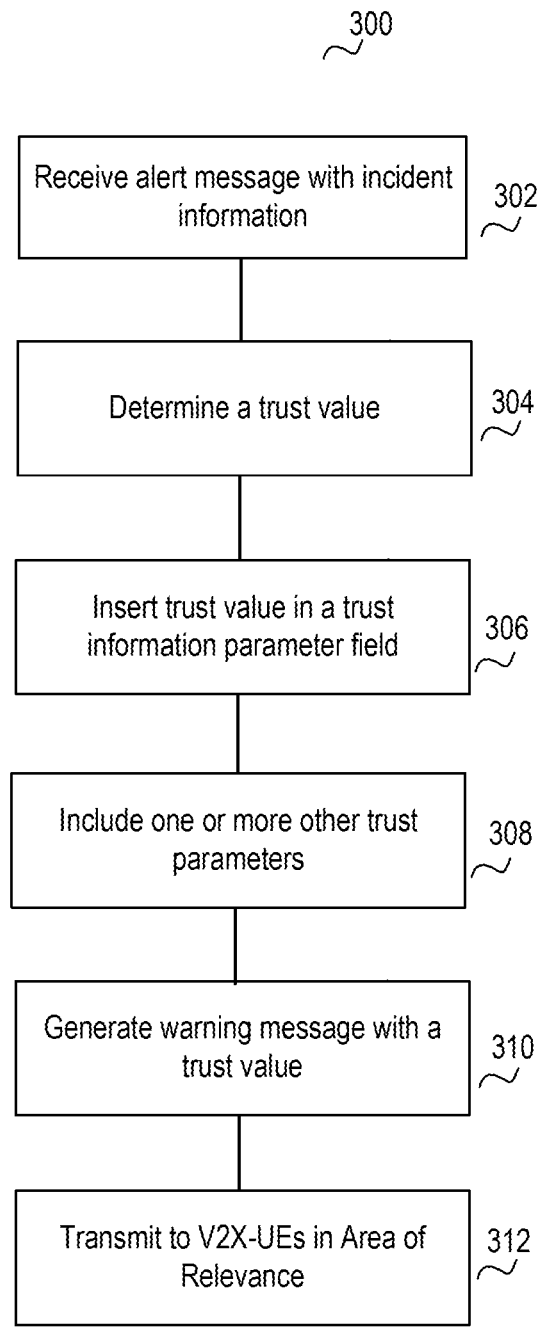
FIG. 3 illustrates a logical flow diagram of an embodiment of a method for generating warning messages with a trust value.

FIG. 3 illustrates a logical flow diagram of an embodiment of a method 300 for generating warning messages with a trust value. The V2X-AS 150 receives an alert message with incident information at 302. The alert message may be from a V2X-UE 110 in an area of relevance 250. The alert message may also originate from another source, such as another V2X-AS 150 or from a traffic service or emergency response service.

The V2X-AS 150 then determines a trust value (such as a level, grade, etc.) associated with the incident information in the alert message at 304. For example, one parameter may include the number of V2X-UEs 110 that have reported the same or similar incident during a predetermined time period. Another parameter may include a counter of the total number of V2X-UEs 110 in the area of relevance 250. Another parameter may include the number of V2X-UEs 110 out of the total number of V2X-UEs 110 in the area of relevance 250 that have reported the same or similar incident. Another parameters may track the time period during which the same or similar incident was reported.

These types of trust parameters may be important for determining a trust value due to the different reasons for a low reporting rate. For example, when only a single V2X-UE 110 of multiple V2X-UEs 110 in an area of relevance 250 has transmitted an alert message of an incident over a predetermined time period, the reporting V2X-UE 110 may be compromised. Alternatively if only one V2X-UE has passed through an area of relevance 250 (e.g. at night or low populated area) during a predetermined time period, the information from the single V2X-UE 110 may have a higher trust value. Intelligent algorithms may be implemented to assess and assign the trust value based on the trust parameters.

Another trust parameter may include a source of information. For example, if the V2X-UE 110 transmitting the alert is a first responder (such as a police vehicle, fire department vehicle, ambulance, etc.) or a reliable weather service, a higher trust value may be placed on the information.

The V2X-AS 150 inserts the determined trust value in a trust information parameter field in the warning message at 306. The V2X-AS 150 may include other trust parameters in the warning message at 308. For example, the reporting rate, a time period between reports, a counter of number of reports, a counter of number of V2X-UEs 110 in the area of relevance 250 during a predetermined time period, a source of the report, etc. may also be included in one or more trust information parameter fields in the warning message.

The V2X-AS 150 generates the warning message at 310. The V2X-AS 150 then transmits the warning message with the trust information parameters to one or more V2X-UEs 110 in an area of relevance 250 over a predetermined time period at 312. For example, a cellular network may broadcast the warning message using the MBMS service 210. The V2X-AS 150 may re-transmit the warning message with the incident information periodically. Alternatively or in addition, the V2X-AS 150 may transmit the warning message asynchronously when updated information is received relating to the incident or trust parameters. In addition, the V2X-AS 150 may determine to halt transmission of warning messages for an incident when no further alert messages or other reports have been received for a predetermined time period. The predetermined time period may depend on the type of incident.

The area of relevance 250 may be determined in response to the incident type. For example, for an accident on a major highway, the area of relevance 250 may be determined to be in a radius of thirty miles around the incident location. The MBMS service 210 transmits the warning message to eNodeBs 106 that include a coverage area in the area of relevance. The eNodeBs 106 then broadcast the warning message within their coverage area. For a less significant incident, e.g., a broken stop light at an intersection, the area of relevance may be a 1 mile radius around the incident location. In another example, a "car proximity warning message" is extremely important for surrounding vehicles but irrelevant to ones not within the proximity Thus, the area of relevance 250 may only be 500 feet.

The V2X-AS 150 or any other node in between receiving the alert message and broadcasting a warning message with the incident information, may re-evaluate the incident information and assign or modify the trust value. Additional messages related to the specific incident in the area of relevance 250 during a predetermined time period are evaluated to continuously reassess and update the trust value associated with the incident information. The V2X-AS 150 may thus increase or decrease the trust value depending on one or more trust parameters.

Embodiment—Evaluating Trust Information

Figure 4:
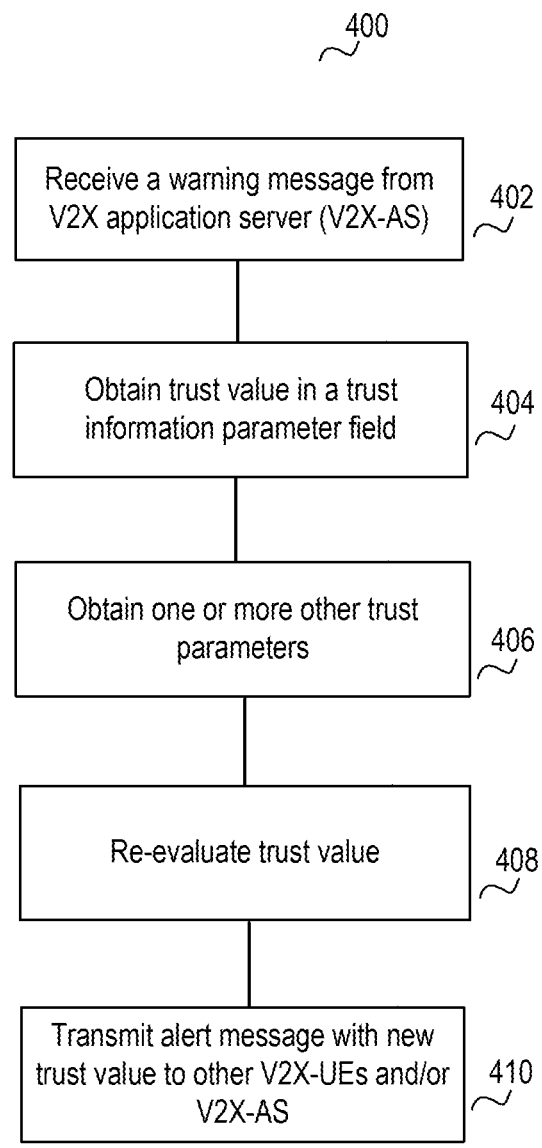
FIG. 4 illustrates a logical flow diagram of an embodiment of a method for processing warning messages with a trust value.

FIG. 4 illustrates a logical flow diagram of an embodiment of a method 400 for processing warning messages with a trust value. A V2X-UE 110 receives a warning message with incident information at 402. The warning message also includes a trust value in a trust information parameter field in 404. The trust value provides an overall trust or confidence level in the accuracy of the incident information. For example, the trust value may represent a probability of accuracy of the incident information or a level of corroboration of the incident information.

The V2X-UE 110 may also obtain other trust parameters from the warning message at 406. For example, the reporting rate, a time period between reports, a counter of number of reports, a counter of number of V2X-UEs 110 in the area of relevance during a predetermined time period, a source of the report, etc. may also be included in one or more trust information parameter fields in the warning message.

The V2X-UE 110 may re-evaluate the trust value at 408. For example, the V2X-UE 110 may have received direct vehicle to vehicle (V2V) alert messages from other UEs or direct Vehicle to Infrastructure (V2I) alert messages from road infrastructure, such as traffic lights, toll booths, etc. The V2X-UE 110 may also have additional information from the vehicle's sensors or other sources. The V2X-UE 110 may then re-evaluate the trust value in the warning message to determine a new trust value. The V2X-UE 110 may then determine whether to perform one or more actions based on the incident information and the trust value. For example, if incident information includes a road closure and the trust value indicates a high level of trust, the vehicle navigation system may recommend an alternate route. The V2X-UE 110 may assign a higher trust value to a warning message that has been broadcast in the past many times in a short period of time more than a message that is broadcasted for the first time.

The V2X-UE 110 may then transmit the incident information in an alert message with the new re-evaluated trust value at 410. The alert message may also include one or more other trust parameters, such as vehicle sensor information, report rates from V2V, V2I and/or V2X messages, etc. The V2X-UE 110 may transmit the alert message at 410 to other V2X-UEs 110 directly over a V2V communication interface, such as a PC5 interface. The V2X-UE 110 may also transmit the alert message to the V2X-AS 150 over a cellular network 100, such as a Uu interface 120, or other type of wireless wide area, long range network 100, including any new trust parameters, sensor information or other information relating to the incident.

In an example, the trust value may fluctuate between 100% and 0% trustworthiness or accuracy. For example, the V2X-AS 150 may determine that incident information from an emergency responder has a 95% accuracy over time and thus assign a trust value of 95% to incident information from the emergency responder. In another example, the V2X-AS 150 may receive an alert message from only a single V2X-UE 110 reporting an incident out of 20 V2X-UEs 110 in the location and so assign a low trust value of 5% to the incident information. The V2X-UE 110 may use machine learning algorithms, such as neural networks, classifier algorithms, clustering algorithms, etc. to determine trust values. In addition, other scales such as 1-10 or letter values (A, B, C, D, F) for the trust value may be implemented as well. The trust value in the incident information may thus depend on or be a measure of an accuracy or reliability of the incident information.

Figure 5:
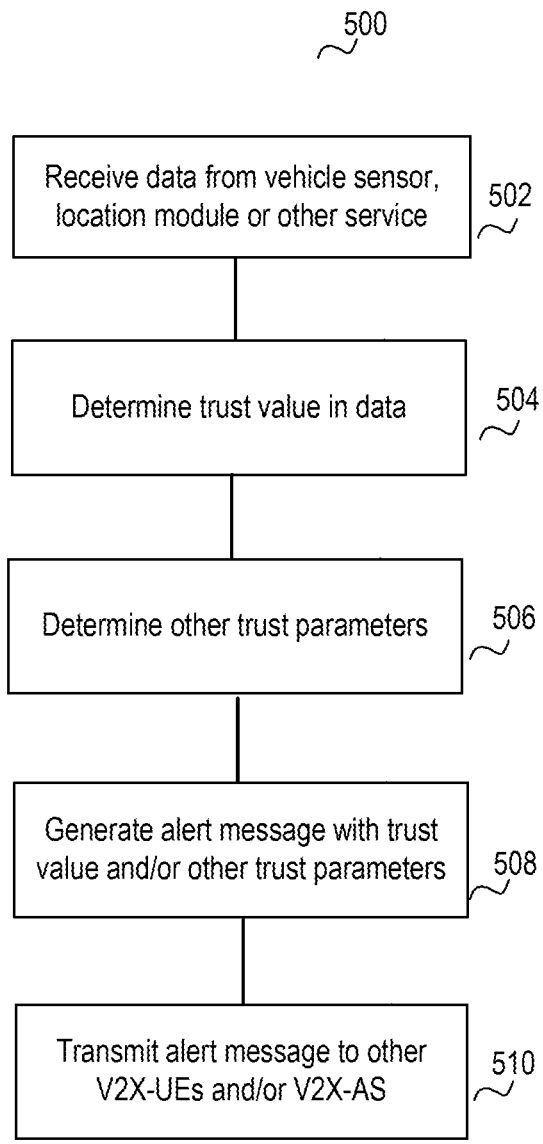
FIG. 5 illustrates a logical flow diagram of an embodiment of a method for generating an alert message with trust parameters.

FIG. 5 illustrates a logical flow diagram of an embodiment of a method 500 for generating an alert message with trust parameters. A V2X-UE 110 receives data from a vehicle sensor, a location module or other vehicle system including incident information. The incident information may include location data, incident type, time period, etc. The V2X-UE 110 determines an overall trust value in the incident information. The V2X-UE 110 may then determine one or more other trust parameters at 506. For example, a time period of the incident, the sensor source, or service source, GPS location or other location information, a photo or video from an on-board camera, etc. The V2X-UE 110 may then generate an alert message with the incident information and the trust value at 508. The alert message may also include the one or more other trust parameters. The V2X-UE 110 may transmit the alert message at 510 to other V2X-UEs 110 directly over a V2V communication, such as a PC5 interface. The V2X-UE may also transmit the alert message to the V2X-AS 150 over a cellular network 100 or other type of wireless wide area, long range network 100.

Figure 6:
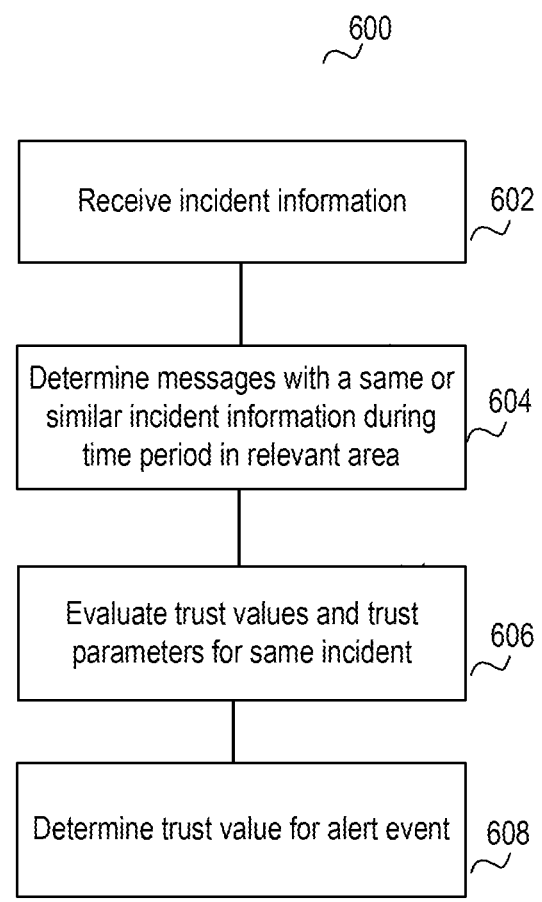
FIG. 6 illustrates a logical flow diagram of an embodiment of a method for determining trust parameters.

FIG. 6 illustrates a logical flow diagram of an embodiment of a method 600 for determining trust parameters. The method may be performed by the V2X-AS 150, a V2X-UE 110 or other node or service receiving incident information. Incident information is received from an alert message, warning message or other source at 602. Other messages with a same or similar incident information is determined at 604. For example, information may be received relating to a different incident in the same area or relating to a same incident type but in a different area of relevance. A comparison of incident type, area of relevance, time period, etc. must be made to determine messages relating to the same incident during a same relevant time period and area.

When information of the same or similar incident are determined and assimilated, the trust values and trust parameters are evaluated at 606. For example, alert messages and warning messages relating to the incident may include trust values and other trust parameters. Trust parameters from other sources may also be evaluated. For example, sensor information, traffic services, GPS, or other sources may provide information about the incident. Using the gathered information about the same or similar incident received from the different sources, a trust value for the incident information is determined at 608. One or more algorithms may be used to calculate the trust value. The trust value and other trust parameters may then be included in alert or warning messages about the incident.

By including trust parameters in V2X type messages, such as alert or warning messages, an accuracy or reliability of incident information may be evaluated. The V2X technology may thus be improved by allowing V2X-UEs 110 to determine a trust level in incident information prior to taking action on the incident information.

Embodiment—V2X Message Format Including Trust Parameter Fields

Figure 7:
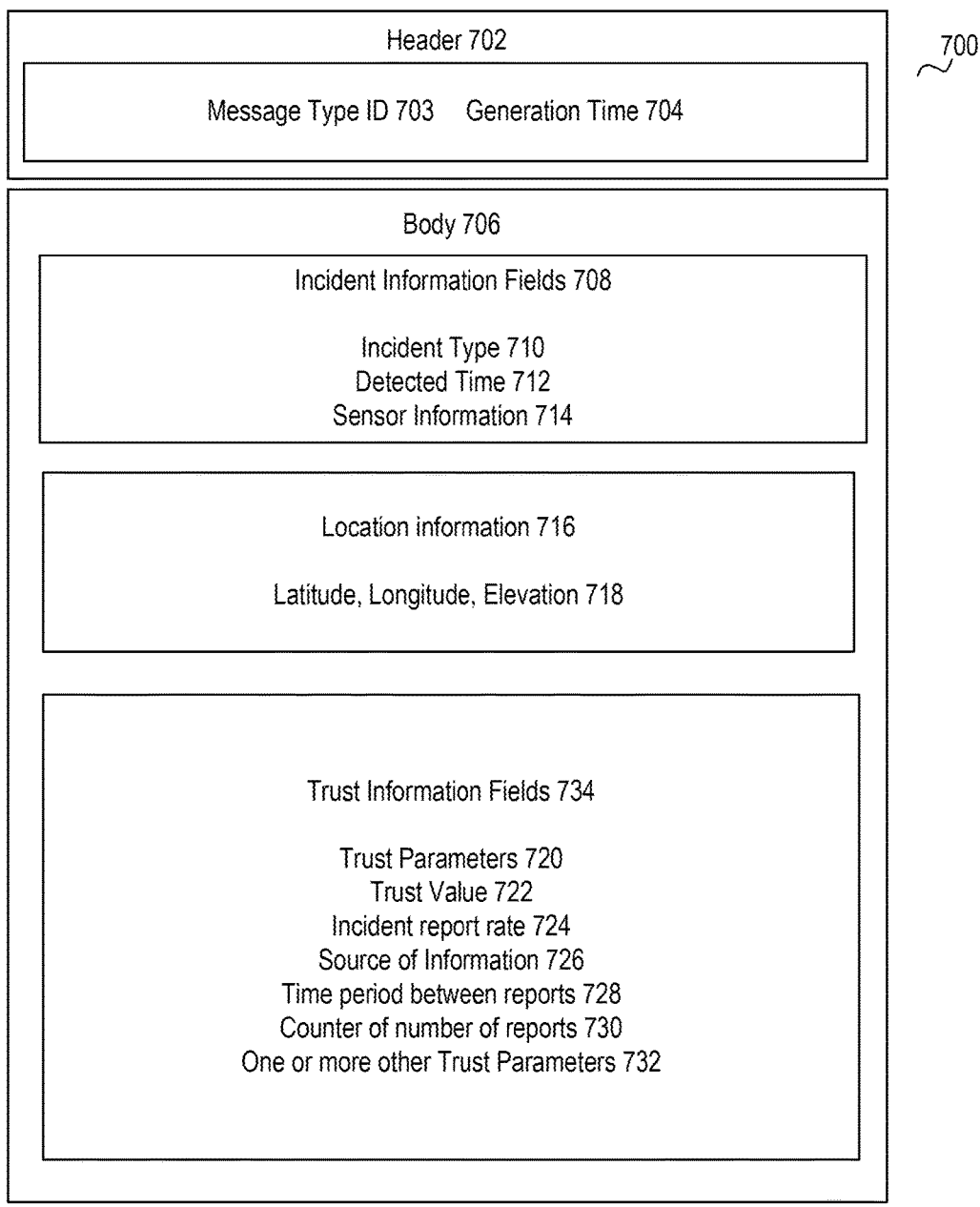
FIG. 7 illustrates a schematic block diagram of an embodiment of example fields in a V2X message.

FIG. 7 illustrates a schematic block diagram of an embodiment of example fields in a V2X message 700. In the example herein, the V2X message 700 includes a DENM message format, e.g., as described in ETSI EN 302 637-3 entitled, "Decentralized Environmental Notification Basic Service," which is hereby incorporated by reference herein. However, other message types, formats, fields or parameters may be implemented in one or more embodiments described herein. For example, other message formats or types may include the trust parameter fields.

The V2X message 700 includes a header 702 and a body 706. The header 702 includes fields, such as a message type identifier (ID) 703 and a generation time 704 of the message. The body 706 includes incident information fields 708 that provide information on the incident. Exemplary fields may include one or more of: an incident type 710, detected time 712 of the incident and/or sensor information 714, such as sensor readings, data or information.

Location information 716 may also be included of the detected incident or location of the V2X-UE 110 when the incident information is recorded. The location information may include one or more of latitude, longitude or elevation 718. So the location information may include location information of the incident and/or of the V2X-UE 110 reporting the incident, such as latitude, longitude and elevation.

The body portion also includes trust information fields 734 that provide information to evaluate the accuracy or reliability of the incident information. For example, the trust information fields 734 may include one or more trust parameters 720 including a trust value 722. Other trust parameters 720 may include an incident report rate 724 and a source of information 726. For example, the source of information 726 may include a source of the incidence information, such as a sensor, first responder, news service, V2X-UE 110, etc. The incident report rate 724 may include a number of alert or broadcast messages received reporting the same or similar incident in a predetermined time period in an area of relevance and a total number of known V2X-UEs 110 in the area of relevance 250. The ratio may provide an indication of accuracy of information, e.g. a high report ratio would indicate a higher trust level or probability of accuracy or reliability of the incident information. A low report ratio may indicate a lower trust level or probability of accuracy of the incident information. For example, a malfunctioning sensor of a V2X-UE 10 or malicious V2X-UE 110 may report the incident information while other V2X-UEs 110 or sources are not reporting a same or similar incident.

The trust information fields 734 may also include a counter of a number of reports 730 that counts a number of messages, either from a central V2X-AS 150 over the LTE network or from other V2X-UEs 110 during a certain time period. Another trust parameter may also include a time period between when a first message was received to subsequent messages are received reporting the same incident. One or more other trust parameters 732 may also be included in the V2X message 700.

Figure 8:
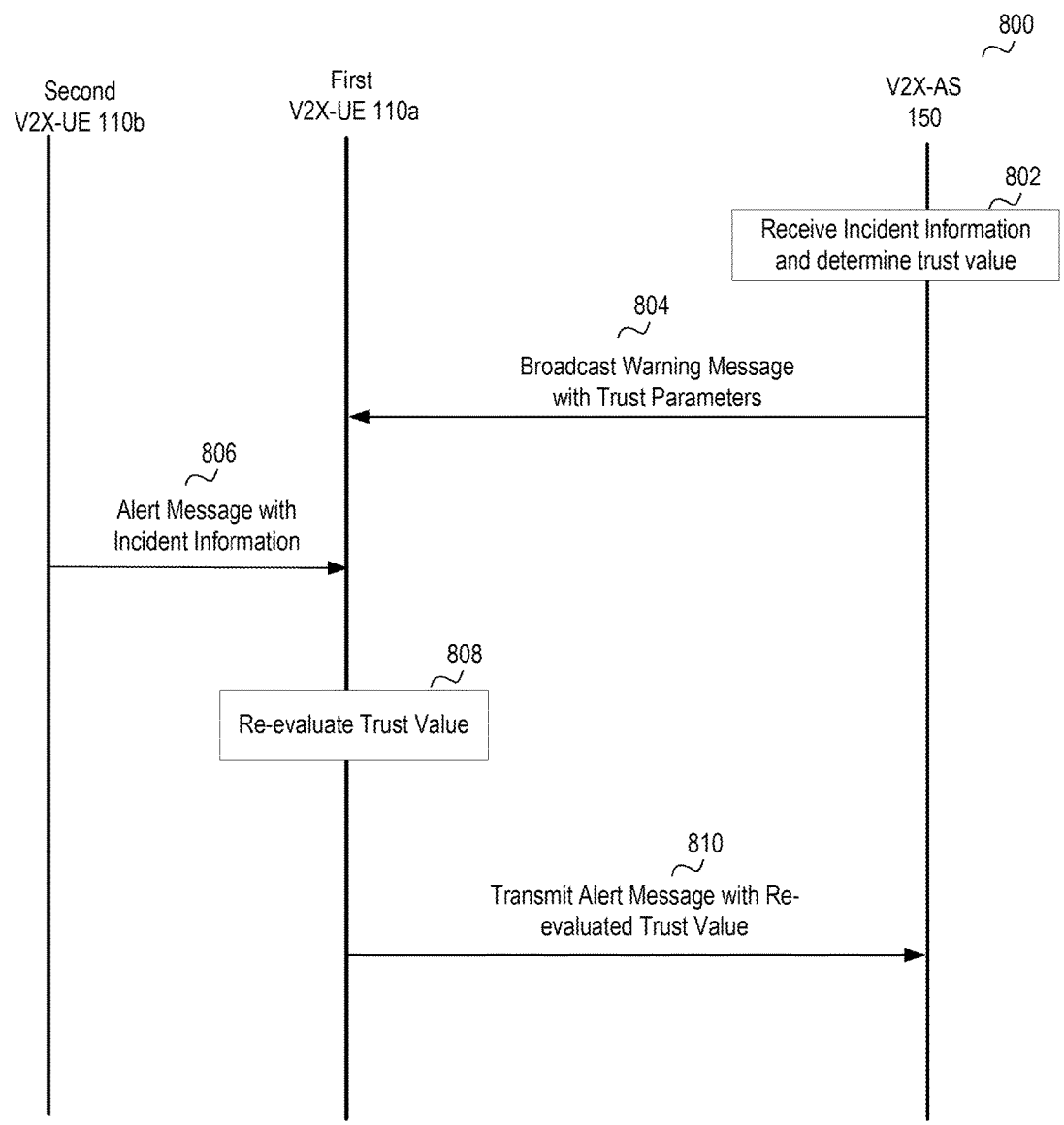
FIG. 8 illustrates a logical flow diagram of an embodiment of a method for providing an alert message with a trust value.

FIG. 8 illustrates a logical flow diagram of an embodiment of a method 800 for providing an alert message with a trust value. In an embodiment, a central unit such as the V2X-AS 150 receives incident information at 802, e.g. an alert message from a V2X-UE 110 or other source. The V2X-AS 150 determines a trust value and generates a warning message including the trust value and other trust parameters. The warning message with trust parameters is broadcast over an LTE or other type of cellular network to an area of relevance during a predetermined period of time at 804. A first V2X-UE 110a receives the broadcast warning message.

In addition, the first V2X-UE 110a may receive a V2V communication, e.g. over a PC5 interface, from a second V2X-UE 110b at 806. The V2V communication includes an alert message with incident information. The first V2X-UE 110a may then re-evaluate the trust value associated with the incident information at 808. For example, the V2X-UE may increase the trust value if the alert message from the second V2X-UE 110b corroborates the incident information from the warning message.

The first V2X-UE 110a may then transmit an alert message with the re-evaluated trust value at 810. The alert message may also include additional incident information or trust parameters, e.g. such as the incident information received from the second V2X-UE 110b in the area of relevance during a certain period of time.

A V2X-UE 110a is thus configured to receive a broadcast warning message with trust parameters, calculate or re-evaluate a trust value, and determine an action related to the incidence using the trust value. For example, the V2X-UE 110a may have a policy to not perform an action in response to an incident with a trust value below a predetermined threshold.

The trust parameters may include a total number of V2X-UEs 110 that have passed a relevant location. Another trust parameter may include a counter of a number of the V2X-UEs 110 reporting the incident. The trust parameters may also include a time period during which alert messages are received relating to the incident. Different reasons may exist for a low rate of reporting of an incident, e.g. a low rate may indicate that only compromised V2X-UEs 110 have reported the incident. Alternatively, a low rate may indicate that only one V2X-UE 110 has passed the incident location (e.g. at night) during the predetermined time period. Thus, these additional trust parameters in V2X messages allow a trust level or probability of accuracy or reliability of the incidence information to be assessed prior to performing an action in response to the incident.

In addition, when only V2V communications (e.g., over PC5 or other type of interface) are received by a V2X-UE 110, the V2X-UE 110 may still determine a trust value or confidence level and provide such information to other V2X-UEs 110 via a PC5 broadcast. These types of V2V communications may not be as reliable as a central unit or V2X-AS 150 evaluation but still provides additional information to a V2X-UE 110 regarding accuracy or reliability of incident information.

For example, a V2X-UE 110 may determine a number of messages received, either from a central V2X-AS 150 unit over the LTE network (then with an additional counter set by network) or from other V2X-UEs 110 during a certain time period. The V2X-UE 110 may then increase a trust level as more messages are received corroborating the incident information. The V2X-UE 110 may also track time periods between when a first message was received to subsequent messages are received reporting the same incident. These trust parameters may be transmitted in an alert message to the V2X-AS 150 or to other V2X-UEs 110.

Embodiment—Centralized V2X Application Server

Figure 9:
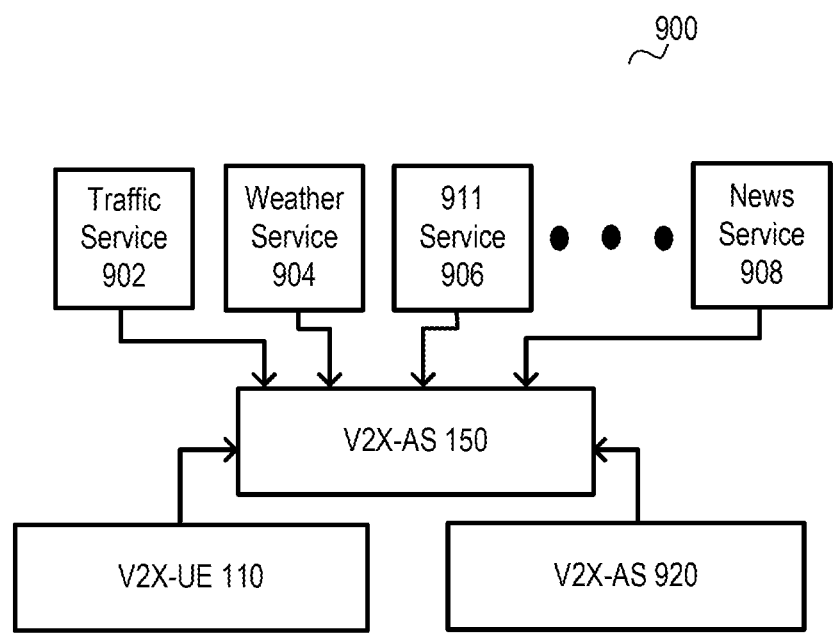
FIG. 9 illustrates a schematic block diagram of an embodiment of a network of sources of information.

FIG. 9 illustrates a schematic block diagram of an embodiment of a network of sources of information 900. The V2X-AS 150 may receive information relating to an incident from one or more sources. For example, the V2X-AS may receive information over a wide area network, such as the Internet, from third party services. Third party services may include a traffic service 902 that provides information on traffic conditions, such as road construction, congestion, traffic delays, accidents, etc. Another third party service may include a weather service 904 that provides information, e.g., on road conditions. Another third party service may include an emergency responder or 911 service 906 or a news service 908. Other third party sources of information may also be provided to the V2X-AS 150.

The V2X-AS 150 may assign a high trust level for incident information received from reliable third party sources. For example, a report of an accident from an emergency responder or 911 service 906 would be given a high trust value. In another example, a report of icy road conditions from a third party weather service 904 would be assigned a high trust value.

The V2X-AS 150 may also receive alert messages with incident information and trust parameters from one or more V2X-UEs 110. The V2X-AS 150 may also receive messages from another V2X-AS 920 or other central units that includes incident information and trust parameters.

The V2X-AS 150 assimilates the information and determines information relating to a same incident, e.g. a same incident type, within a same geographical location and within a predetermined time period. The V2X-AS 150 then determines a trust value and other trust parameters for the incident. The V2X-AS 150 generates a warning message with the incident information, trust value and other trust parameters for broadcast within an area of relevance.

Figure 10:
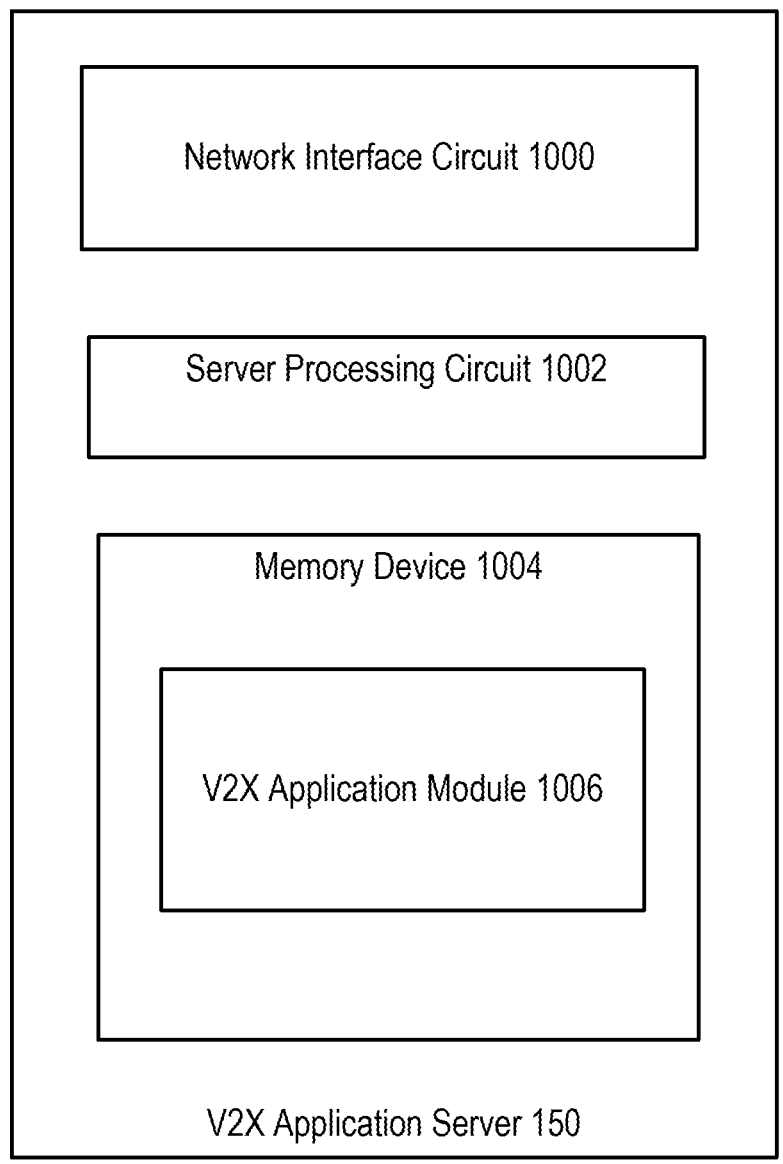
FIG. 10 illustrates a schematic block diagram of an exemplary embodiment of a V2X application server in more detail.

FIG. 10 illustrates a schematic block diagram of an exemplary embodiment of a V2X-AS 150 in more detail. The V2X-AS 150 includes a network interface circuit 1000 for wireless and/or wired network communications with one or more of the exemplary network nodes in an LTE network or other type of long range wireless or cellular network 100. The V2X-AS 150 may be included in an LTE service provider network or in a third party service provider network that communicates through the LTE service provider network. Alternatively, the V2X-AS 150 may be implemented as an MEC application server in the radio access network (RAN), e.g. incorporated within an eNodeB 106, or by a MEC application server coupled to the eNodeB 106. The LTE service provider may provide authorized third-parties, such as application developers and content providers, to provide the V2X service described herein at the network or RAN level. Thus the V2X-AS 150 or its functions described herein may be implemented in an MEC application server deployed at an eNodeB 106 that is part of a RAN in an LTE cellular network, or at a Radio Network Controller (RNC) that is part of a 3G cellular network and/or at a multi-technology cell aggregation site or at a network level of the EPC of the LTE network.

The network interface circuit 1000 may also include authentication capability that provides authentication prior to allowing access to some or all of the resources or services of the V2X-AS 150. The network interface circuit 1000 may also include firewall, gateway and proxy server functions. The V2X-AS 150 also includes a server processing circuit 1002 and a memory device 1004. The memory device 1004 is a non-transitory, processor readable medium that stores instructions and data. The V2X-AS server 150 further includes a V2X application module 1006 that may include processing instructions, data and other information stored in the memory device which when executed by the server processing circuit, causes the server processing circuit to perform one or more functions described herein with respect to the V2X-AS 150.

Embodiment—V2X User Equipment in a Vehicle

Figure 11:
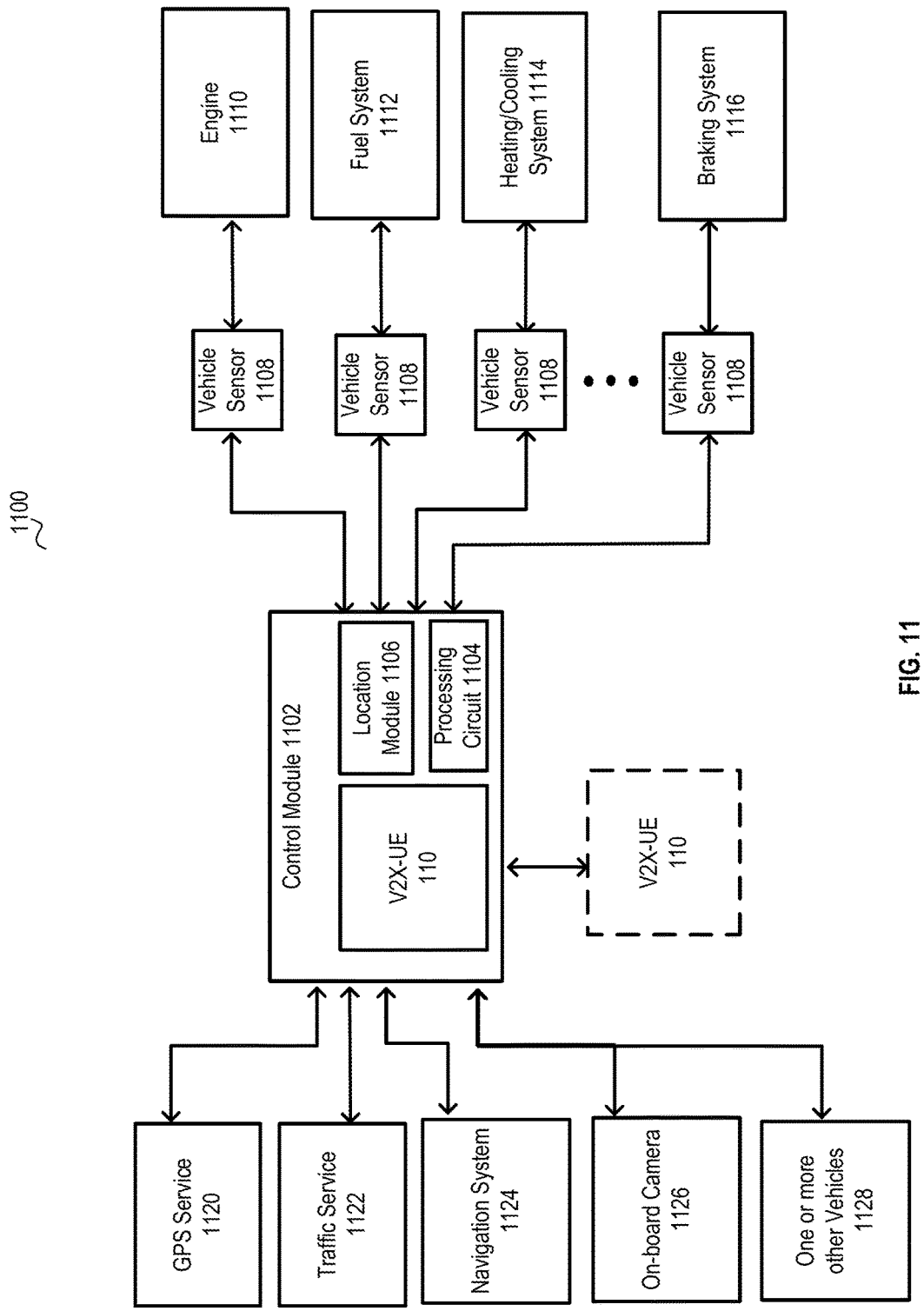
FIG. 11 illustrates a schematic block diagram of an exemplary embodiment of a vehicle including a V2X-UE.

FIG. 11 illustrates a schematic block diagram of an exemplary embodiment of a vehicle 1100 including a V2X-UE 110. The V2X-UE 110 may be incorporated within a control module 1102 of the vehicle 1100 or may include a separate entity or node communicatively coupled to the control module 1102 (e.g. as shown in italics). The control module 1102 includes a processing circuit 1104 operable to process or perform one or more functions described herein. The control module 1102 may also include an internal or external location module 1106 that performs location awareness functions.

The control module 1102 is coupled or interconnected to a plurality of vehicle sensors 1108. In an embodiment, the vehicle sensors 1108 are coupled to or interconnected with a plurality of systems and components of the vehicle 1100, including, e.g. an engine 1110, fuel system 1112, heating/cooling system 1114, braking system 1116, etc. The vehicle sensors 1108 may include various types of sensors to monitor the various systems and components of the vehicle 1100. For example, the vehicle sensors 1108 may include temperature sensors, pressure sensors, timers, clock, warnings, fuel levels, speedometer, RPMs, etc. Other types of vehicle sensors 1108 may also be implemented.

The control module 1102 may also be coupled to one or more services, such as a global positioning satellite (GPS) service 1120, traffic service 1122, navigation system 1124, on-board camera 1126, etc. The control module 1102 either through the V2X-UE 110 or other transceiver is also operable to receive information from one or more other vehicles or V2X-UEs 110, such as other vehicles, infrastructure, etc. The location module 1106 is operable to determine a location of the vehicle 1100 using one or more of the services or systems, such as the GPS service 1120, traffic service 1122, navigation system 1124 and/or on-board camera 1126.

The V2X-UE 110 receives incident information from the one or more vehicle sensors 1108 or services or other systems. Location information of the incident may be received from the location module 1106 or directly from the GPS service 1120, navigation system 1124 or other service. The V2X-UE 110 may also receive V2X messages from other vehicles or the V2X-AS 150 over the LTE or other cellular network. Based on information from these sources, the V2X-UE 110 may determine incident information and trust parameters including a trust value. The V2X-UE 110 may communicate the information to the control module 1102 to perform one or more actions, e.g. active braking, recalculate a route in the navigation system, provide a warning to the driver, etc.

Figure 12:
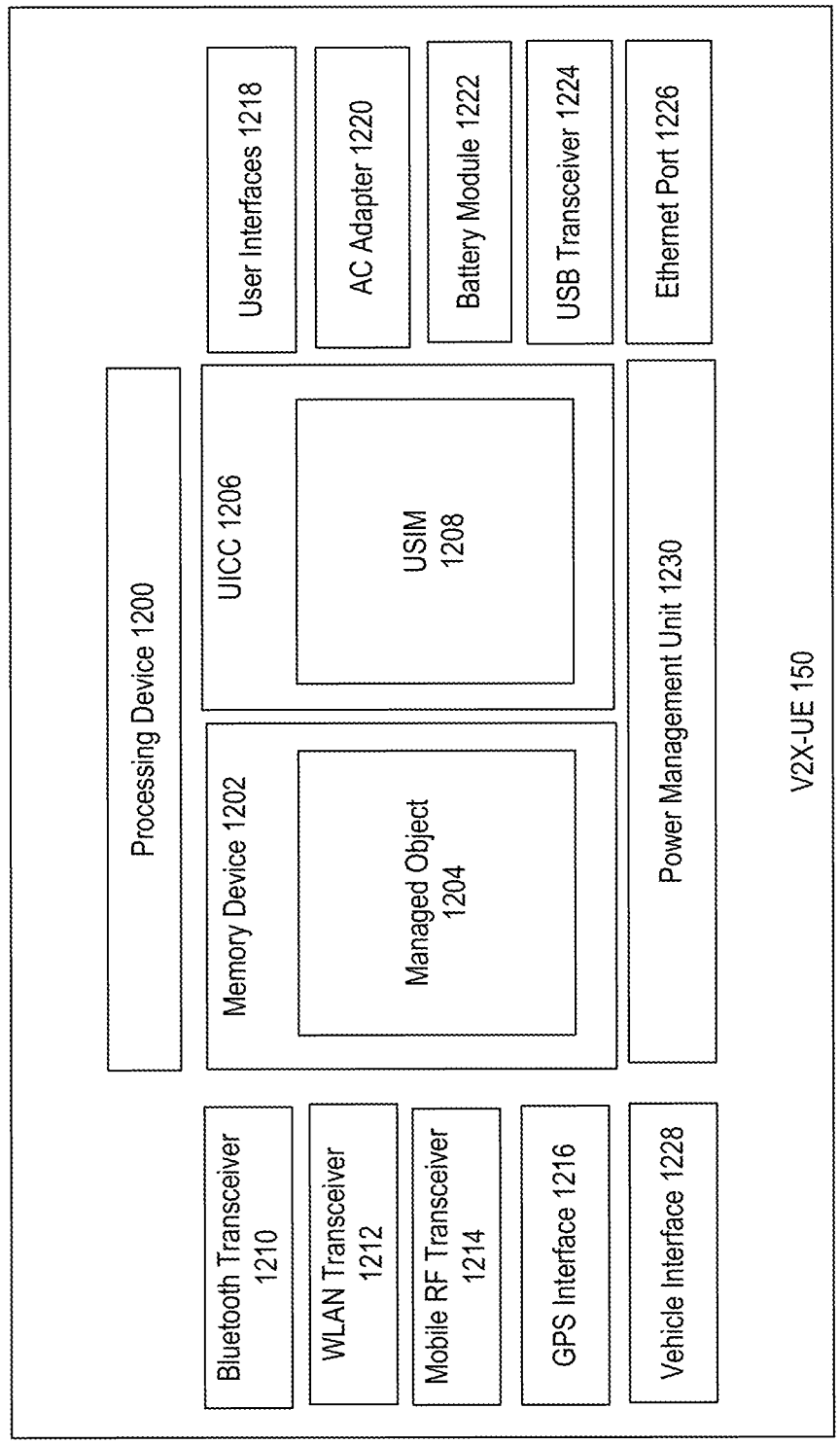
FIG. 12 illustrates a schematic block diagram of an exemplary embodiment of a V2X-UE in more detail.

FIG. 12 illustrates a schematic block diagram of an exemplary embodiment of a V2X-UE 110 in more detail. The V2X-UE 110 may be implemented in a vehicle, such as a car, bicycle, train, drone, plane, helicopter, ship, etc. The V2X-UE 110 may also be implemented in user equipment (UE) including a smart phone, smart tablet, laptop, smart watch, PC, TV or other device. Additional or alternative components and functions may be included within the V2X-UE 110 than illustrated herein. In addition, one or more of the functions and components shown herein may not be present or combined with other components or functions.

The V2X-UE 110 may include a processing device 1200 and memory device 1202 that are configured to perform one or more of the functions described herein with respect to the V2X-UE 110. The memory device may include a managed object 1204 that stores instructions, processes and data that when executed by the processing device 1200 causes the V2X-UE 110 to perform one or more functions described herein. The V2X-UE 110 may also include a Universal Integrated Circuit Card (UICC) 1206 that includes a UMTS Subscriber Identify Module (USIM) 1208 for storage of the International Mobile Subscriber Identity (IMSI) 1208. In other embodiments, the V2X-UE 110 does not have UICC capabilities, e.g. the V2X-UE 110 does not include a UICC or the UICC is inoperable.

The V2X-UE 110 may further include a Bluetooth transceiver 1210, a WLAN (IEEE 802.11x compliant) transceiver 1212, mobile RF (3G/4G/5G) transceiver 1214 and GPS Interface 1216. The WLAN transceiver 1212 may operate as a non-3GPP access interface to a WLAN network. The V2X-UE 110 may further include user interfaces 1218, AC adapter 1220, battery module 1222, USB transceiver 1224 and Ethernet Port 1226.

When operated in a vehicle 1100, the V2X-UE 110 may further include a vehicle interface 1228 to communicate with the vehicle control module 1102, vehicle sensors 1108, location module 1106 or other vehicle systems or services. The V2X-UE 110 may also include other applications, such as a touch screen controller, speaker or microphone. The V2X-UE 110 may also include a power management unit 1230. One or more internal communication buses (not shown) may communicatively couple one or more of the components of the V2X-UE 150.

In one or more embodiments described herein, the V2X-AS 150 or the V2X-UE determines a trust value in incident information using one or more trust parameters. The V2X-AS 150 may include the trust value as a parameter in a warning message 230 and then distributed to V2X-UEs 110 in an area of relevance 250. A V2X-UE 110 in the area of relevance 250 receiving the warning message 230 may also re-evaluate the assigned trust value of the information based on further trust parameters or incident information. The V2X-UE 110 may determine to perform one or more actions based on the trust value, e.g. providing a warning to a user, perform braking, etc.

A processing circuit or processing device device as described herein includes at least one processing device, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory may be a single memory device or a plurality of memory devices. The memory device may be a read-only memory, random access memory, volatile memory, non-volatile memory, static memory, dynamic memory, flash memory, cache memory, and/or any non-transitory memory device that stores digital information. The term "module" is used in the description of one or more of the embodiments of elements herein. A module includes one or more processing devices and/or one or more non-transitory memory devices operable to perform one or more functions as may be described herein. A module may operate independently and/or in conjunction with other modules and may utilize the processing device and/or memory of other modules and/or operational instructions of other modules. As also used herein, a module may contain one or more sub-modules, each of which may be one or more modules.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects have been described with reference to specific examples. Various modifications and changes may be made, however, without departing from the scope of the claims. The specification and figures are illustrative, rather than restrictive, and modifications are intended to be included within the scope of the claims. Accordingly, the scope of the claims should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present embodiments, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

What is claimed is:

1. An application server, comprising:
   a network interface configured to communicate with one or more components in a wireless network; and
   a processing circuit configured to:
   receive an alert message from user equipment (UE) in a vehicle over the wireless network;
   process incident information included in the alert message;
   determine a trust value associated with the incident information and an incident type;
   insert the trust value in a trust information parameter field of a warning message;
   determine an area of relevance in response to the incident type; and
   transmit the warning message for broadcast by the wireless network within the area of relevance.

2. The application server of claim 1, wherein the processing circuit is configured to determine the trust value associated with the incident information by:
   determining a first trust parameter of a number of UEs in the area of relevance; and
   determining a second trust parameter of a number of the UEs in the area of relevance that have transmitted an alert message including the incident information.

3. The application server of claim 2, wherein the processing circuit is further configured to determine the trust value associated with the incident information by:
   determining a third trust parameter of a ratio of the number of the UEs in the area of relevance that have transmitted an alert message including the incident information to the number of UEs in the area of relevance; and
   evaluating the trust value using the ratio.

4. The application server of claim 1, wherein the processing circuit is further configured to:
   receive the incident information from one or more third party services including one or more of: a traffic service, weather service or news service; and
   assign a higher trust value to the incident information from the one or more third party services.

5. The application server of claim 4, wherein the processing circuit is further configured to:
   receive the incident information from one or more other application servers in the wireless network.

6. The application server of claim 5, wherein the processing circuit is further configured to:
   receive another alert message including second incident information of a second incident from second user equipment (UE) in a vehicle over the wireless network; and
   determine the second incident information relates to a same or similar incident by evaluating the second incident information, wherein the second incident information includes an incident type, predetermined time period and an area of relevance of the second incident.

7. A central server configured to track incident information, comprising:
   a network interface configured to communicate with one or more components in a wireless network; and
   a processing circuit configured to:
   receive an alert message from user equipment (UE) in a vehicle over the wireless network;
   process incident information for an incident included in the alert message and determine a first trust value associated with the incident information;
   receive the incident information for the incident from a third party service; and
   determine an updated trust value associated with the incident information, wherein the updated trust value is a higher trust value;
   insert the updated trust value in a trust information parameter field of a warning message; and
   transmit the warning message for broadcast by the wireless network within an area of relevance.

8. The central server of claim 7, wherein the processing circuit is configured to:
   receive the incident information for the incident from the third party service, wherein the third party service is a traffic service.

9. The central server of claim 7, wherein the processing circuit is configured to:
   receive the incident information for the incident from the third party service, wherein the third party service is a weather service.

10. The central server of claim 7, wherein the processing circuit is configured to:
    receive the incident information for the incident from the third party service, wherein the third party service is a news service.

11. The central server of claim 7, wherein the processing circuit is further configured to:
    receive the incident information from another application server configured to track incident information in the wireless network.

12. The central server of claim 7, wherein the processing circuit is further configured to:
    determine an incident type using the incident information; and
    determine the area of relevance in response to the incident type.

13. A server, comprising:
    a network interface configured to communicate with vehicles over a wireless network; and
    a processing circuit configured to:
    receive incident information from one of the vehicles over the wireless network;
    determine a trust value associated with the incident information and an incident type;
    determine an area of relevance in response to the incident type;
    insert the trust value in a trust information parameter field of a warning message; and
    transmit the warning message for broadcast by the wireless network within the area of relevance.

14. The server of claim 13, wherein the area of relevance includes an area with a predetermined radius around an incident location, wherein the predetermined radius is determined in response to the incident type.

15. The server of claim 13, wherein the processing circuit is further configured to:
    receive the incident information from a third party service; and
    determine an updated trust value associated with the incident information, wherein the updated trust value is a higher trust value.

16. The server of claim 14, wherein the processing circuit is further configured to:
    insert the updated trust value in the trust information parameter field of an updated warning message; and transmit the updated warning message for broadcast by the wireless network within the area of relevance.

17. The server of claim 16, wherein the processing circuit is configured to:
receive the incident information from the third party service, wherein the third party service is a traffic service.

18. The server of claim 16, wherein the processing circuit is configured to:
receive the incident information from the third party service, wherein the third party service is a weather service.

19. The server of claim 16, wherein the processing circuit is configured to:
receive the incident information from the third party service, wherein the third party service is a news service.

20. The server of claim 13, wherein the processing circuit is further configured to:
receive the incident information from another application server configured to track incident information in the wireless network.

* * * * *